US010253957B2

(12) United States Patent
Troop, II

(10) Patent No.: US 10,253,957 B2
(45) Date of Patent: Apr. 9, 2019

(54) LIGHTING ARRANGEMENT

(71) Applicant: Lifetime Products, LLC., South El Monte, CA (US)

(72) Inventor: David Robert Troop, II, South El Monte, CA (US)

(73) Assignee: Lifetime Products, LLC, South El Monte, CA (US)

( * ) Notice: Subject to any disclaimer, the term of this patent is extended or adjusted under 35 U.S.C. 154(b) by 0 days.

(21) Appl. No.: 16/005,123

(22) Filed: Jun. 11, 2018

(65) Prior Publication Data

US 2019/0032899 A1 Jan. 31, 2019

Related U.S. Application Data

(60) Provisional application No. 62/536,848, filed on Jul. 25, 2017.

(51) Int. Cl.
  *F21V 19/00* (2006.01)
  *F21V 15/01* (2006.01)
  *F21V 17/10* (2006.01)

(52) U.S. Cl.
  CPC .......... *F21V 19/0015* (2013.01); *F21V 15/01* (2013.01); *F21V 17/10* (2013.01)

(58) Field of Classification Search
  CPC ....... F21V 19/0015; F21V 15/01; F21V 17/10
  See application file for complete search history.

(56) References Cited

U.S. PATENT DOCUMENTS

2007/0053182 A1* 3/2007 Robertson ............. F21V 19/003
  362/228

FOREIGN PATENT DOCUMENTS

| CA | 118114 S | * | 11/2007 | |
| CN | 2802892 Y | * | 8/2006 | ............. H02B 35/00 |
| CN | 201244563 Y | * | 5/2009 | ............. B07C 5/342 |
| CN | 201830719 U | * | 5/2011 | ............... A01G 9/26 |
| CN | 202946973 U | * | 5/2013 | ................. F21S 2/00 |
| CN | 102705739 B | * | 8/2014 | ............... F21K 9/27 |
| KR | 20170053358 A | * | 5/2017 | ............... A01G 9/10 |
| WO | WO-0147037 A1 | * | 6/2001 | ....... G02F 1/133603 |
| WO | WO-2004036618 A1 | * | 4/2004 | ......... C09K 11/7774 |

* cited by examiner

*Primary Examiner* — Donald L Raleigh
(74) *Attorney, Agent, or Firm* — Smyrski Law Group, A P.C.

(57) ABSTRACT

A combined fluorescent and Light Emitting Diode (LED) lighting apparatus is provided. The apparatus includes two fluorescent lighting fixtures, each fluorescent lighting fixture configured to receive fluorescent light bulbs and having a lengthwise channel on a top surface proximate a longest side, and a mounting bracket having two external edges configured to fit into lengthwise channels on the two fluorescent lighting fixtures and configured to receive and maintain an LED light fixture.

20 Claims, 5 Drawing Sheets

LIGHTING ARRANGEMENT

This application claims the benefit of U.S. Provisional Patent Application Ser. No. 62/536,848, filed Jul. 25, 2017, inventor David Robert Troop, the contents of which are incorporated herein by reference in their entirety.

BACKGROUND OF THE INVENTION

Field of the Invention

The present invention relates generally to lighting, and more specifically to specialty lighting fixtures used in areas such as enclosures, including but not limited to desktop aquariums as well as land animal and/or plant enclosures.

Description of the Related Art

Enclosures such as aquariums frequently include lighting arrangements enabling observers to clearly see fish, land animals, plants, and/or other objects contained therein. Certain plants and animals, and certain circumstances, lend themselves to one type of lighting solution as opposed to another—for example, some situations enable clear viewing of particular details of interest using fluorescent lighting, while others benefit or even require LED (light emitting diode) lighting. As may be appreciated, certain features can be observed better in certain types of lighting, and some creatures can be frightened or even harmed by a level of lighting that is too intense.

Typical solutions have offered a single lighting option—fluorescent or LED lighting only has traditionally been the norm. Previous lighting designs did not include both types of lighting in a single fixture that can be provided atop an animal or sea life enclosure and/or plant enclosure or above an area where users are viewing particular features of plants, animals, and/or objects.

In light of the foregoing, it would be advantageous to offer a device that addresses issues with enclosure lighting issues, such as lighting in aquariums, enabling a user to select different types of lighting depending on circumstances.

SUMMARY OF THE INVENTION

Thus according to one aspect of the present design, there is provided a combined fluorescent and Light Emitting Diode (LED) lighting apparatus, comprising two fluorescent lighting fixtures, each fluorescent lighting fixture configured to receive fluorescent light bulbs and having a lengthwise channel on a top surface proximate a longest side and a mounting bracket having two external edges configured to fit into lengthwise channels on the two fluorescent lighting fixtures and configured to receive and maintain an LED light fixture.

According to a further aspect of the present design, there is provided a combined fluorescent and LED lighting apparatus, comprising two fluorescent lighting fixtures, each fluorescent lighting fixture configured to receive fluorescent light bulbs and a mounting bracket having two external edges configured to fit into a first lengthwise channel on a first fluorescent lighting fixture and a second lengthwise channel on a second fluorescent lighting fixture. The mounting bracket is configured to receive and maintain an LED light fixture.

According to another aspect of the present design, there is provided a lighting apparatus, comprising two fluorescent lighting fixtures, each fluorescent lighting fixture configured to receive fluorescent light bulbs and an LED lighting source mounting bracket configured to receive and maintain an LED light fixture. The LED lighting source mounting bracket is formed with two external edges configured to fit into a first lengthwise channel on a first fluorescent lighting fixture and a second lengthwise channel on a second fluorescent lighting fixture.

These and other advantages of the present invention will become apparent to those skilled in the art from the following detailed description of the invention and the accompanying drawings.

BRIEF DESCRIPTION OF THE DRAWINGS

The present invention is illustrated by way of example, and not by way of limitation, in the figures of the accompanying drawings in which.

The exemplification set out herein illustrates particular embodiments, and such exemplification is not intended to be construed as limiting in any manner.

DETAILED DESCRIPTION OF THE INVENTION

The following description and the drawings illustrate specific embodiments sufficiently to enable those skilled in the art to practice the system and method described. Other embodiments may incorporate structural, logical, process and other changes. Examples merely typify possible variations. Individual components and functions are generally optional unless explicitly required, and the sequence of operations may vary. Portions and features of some embodiments may be included in or substituted for those of others.

The present design includes a novel bracket arrangement that enables the combination of fluorescent bulbs with a variety of different LED fixtures into a single unit. Additional brackets can be added to the unit to accommodate additional LED fixtures and increase the light output of the unit as a whole.

The present description is primarily directed to lighting in a fish tank or aquarium situation, but the design is not so limiting. While terms such as "aquarium" are employed herein, it is understood that any type of lighting situation that can benefit from multiple types of lighting may be addressed with the present design. Use of the term "aquarium," "enclosure," or the like is intended to be instructive and not in any way limiting. Further, while the present design is contemplated to be employed with an enclosure such as an aquarium, terrarium, or otherwise, it may be used in whole or in part in any situation where two styles of lighting may be beneficial, such as over a work area, e.g. a desk or table.

The present light housing utilizes several mounting brackets to attach the LED light fixture of choice to the housing and can hold commonly available fluorescent light bulbs, and more particularly one or more T5HO fluorescent light bulbs. The housing forms a complete "hybrid" light fixture with both fluorescent and LED light output using the novel mounting brackets presented herein. Multiple types and brands of LED fixtures may be employed, and the result is LED and fluorescent lighting being provided in a single unified design.

Figure 1:
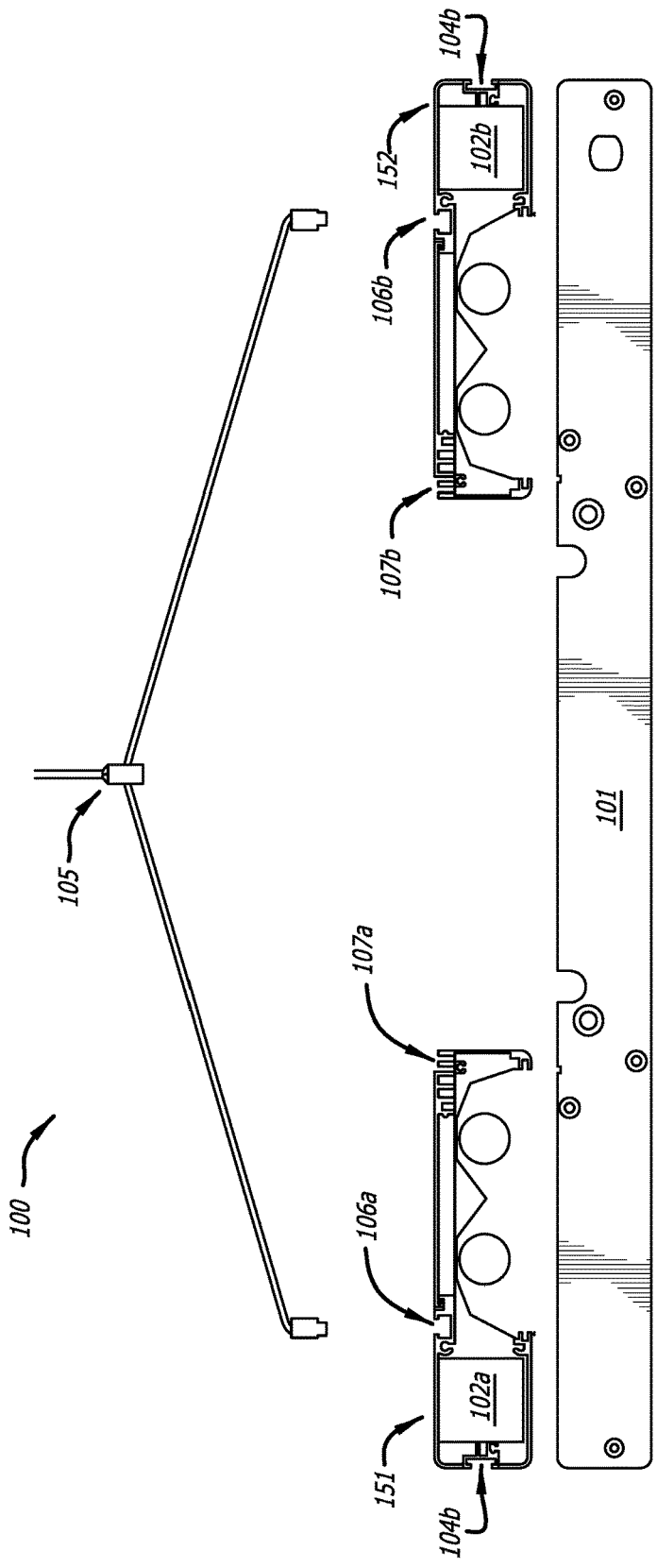
FIG. 1 is a cross section of the combined fluorescent and LED lighting arrangement.

FIG. 1 is a cross section of the design, where the overall fixture 100 comprises two individual fluorescent elements 151 and 152 that are generally rectangular in shape. Each fluorescent element may include a short side, approximately four inches in length, and a long side, approximately 30 inches or more in one embodiment. Current commercially available fluorescent fixtures range in size from about 24 inches to about 61 inches, or exactly these dimensions, but the present design is not so limited. Other sizes of fluorescent fixtures may be employed, wherein the fluorescent fixtures include the channels described and pictured herein. End plate 101 is provided to cover a part of the short side of each of the two individual fluorescent elements. End plate thus 101 fits over and is, when assembled, attached to left fluorescent element 151 and right fluorescent element 152. FIG. 1 illustrates end plate 101 disassociated from the fluorescent elements 151 and 152, but in practice it would cover both and attach to both. A corresponding cover is provided on the other end of the fluorescent elements and is not shown in this view.

The fluorescent elements include electronic ballast elements 102a and 102b and each fluorescent element has a channel formed on the top of the fluorescent element, shown as channels 107a and 107b in FIG. 1. The presence of these channels 107a and 107b enable the insertion of relevant components such as LED lighting as discussed herein. FIG. 1 also illustrates suspension hardware 105 usable to suspend the entire lighting arrangement above the enclosure (not shown in this view). Suspension hardware may join the fluorescent fixtures 151 and 152 at established points, such as points 106a and 106b representing indentations or openings formed in the fluorescent elements and configured to receive components of the suspension hardware 105. Additionally, a channel, shown here as two channels 104a and 104b, is provided on the exterior of one or both of the fluorescent fixtures such that the fixtures can be mounted to an enclosure using additional mounting brackets or support hardware.

Figure 2A:
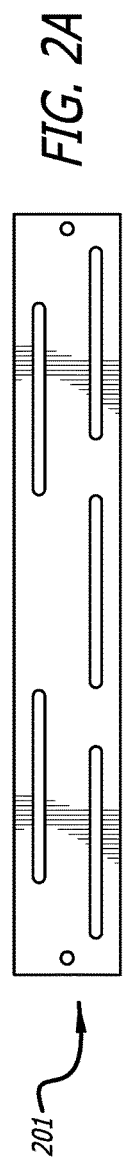
FIG. 2A illustrates a top view of a slotted first bracket usable with the present design.
Figure 2B:
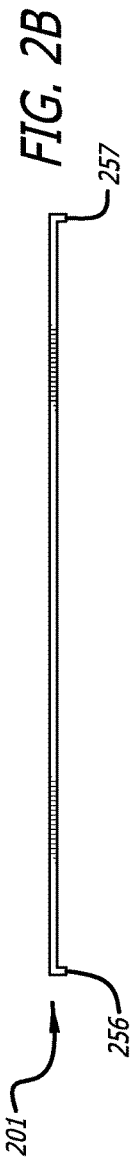
FIG. 2B is a side view of the slotted first bracket of FIG. 2A.
Figure 2C:
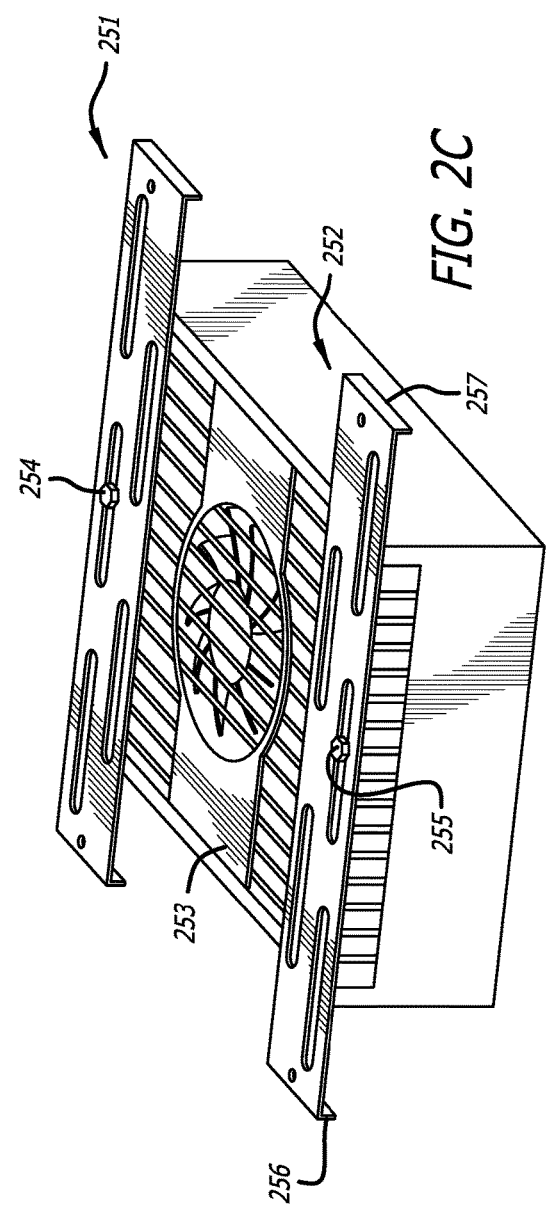
FIG. 2C shows two slotted first brackets including edges attached to an LED light having a fan that can be employed to maintain various types of LED lights using channels of fluorescent lighting sources of the present design.

From FIG. 2A, bracket 201 is a slotted bracket wherein two edges are provided in order to engage channels 107a and 107b of the fluorescent elements 151 and 152. FIG. 2B shows a side view of the bracket of FIG. 2A, while FIG. 2C illustrates two such brackets 251 and 252 attached to an LED light having a fan 253, in this view using screws 254 and 255. Screws or bolts may be employed to hold any necessary component above the enclosure (not pictured in this view). The brackets 251 and 252 each include edges, shown as edges 256 and 257 in both FIGS. 2A and 2B, enabling the assembled unit, here a different type of LED light with a fan, to be positioned within channels 107a and 107b shown in FIG. 1. Lighting or other components may be provided using similar brackets. Note that holes are provided at the outer edge of the brackets, such as near the edges of bracket 251, enabling a user to further secure the brackets by screwing them into the fluorescent components.

Figure 3:
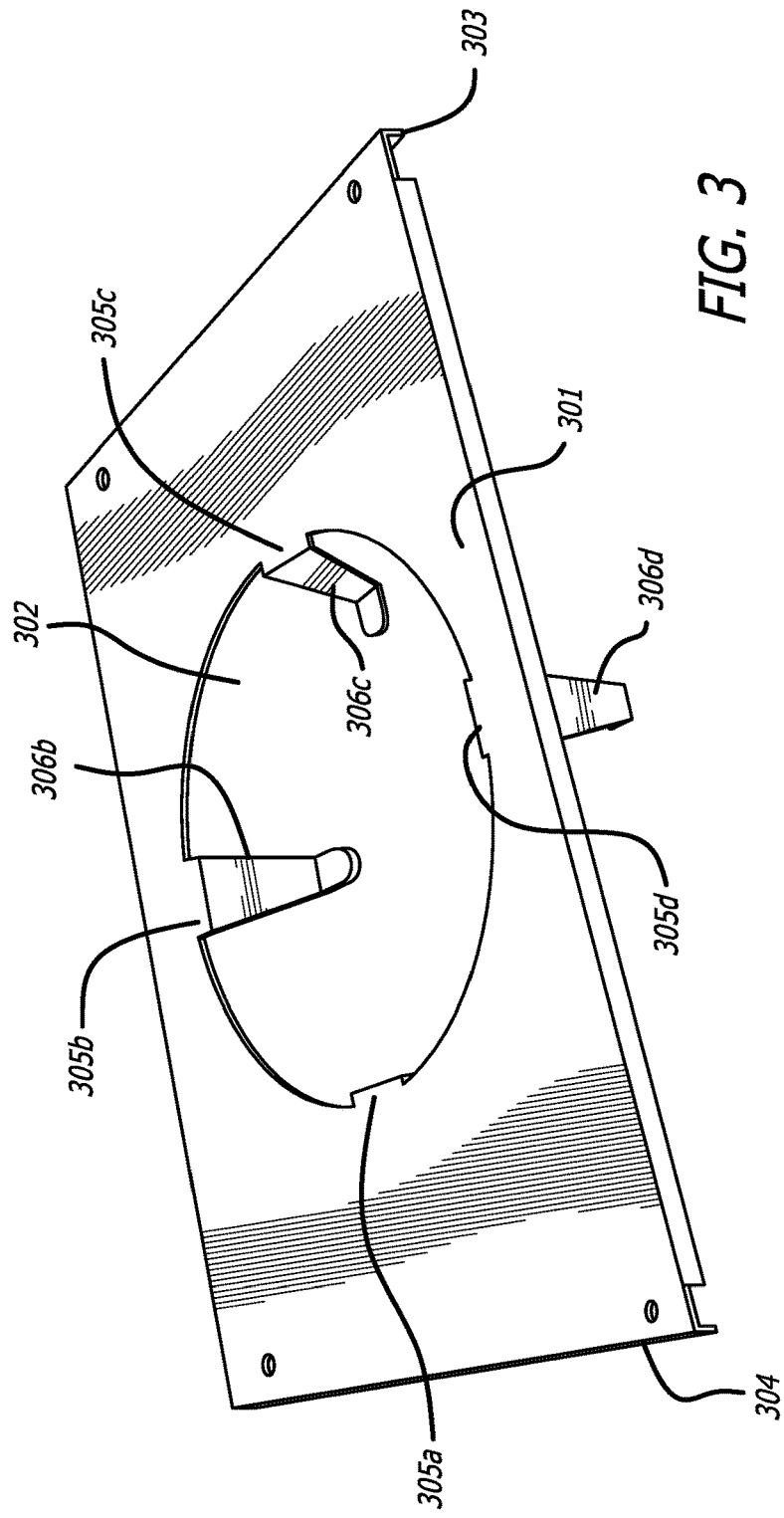
FIG. 3 illustrates a second bracket used to provide LED lighting to the area or into an enclosure, such as an aquarium.

FIG. 3 illustrates a second bracket used to provide LED lighting into the enclosure (not shown). Second bracket 301 includes a central hole 302, edges 303 and 304 for locating the second bracket 301 in channels 107a and 107b, and is typically fashioned of metal but may be made of other materials that perform similar functionality.

Four indentations, 305a, 305b, 305c, and 305d are provided to receive an LED lighting housing, typically circular but other shapes may be employed, and four below-level holding elements 306a (not visible in this view), 306b, 306c, and 306d are provided to secure and maintain the LED lighting housing above the area and/or enclosure.

Particularly of note with respect to the design of FIG. 3 is that the bracket is rectangularly shaped and not square shaped. Additionally, all four of the sides of the rectangular bracket include an edge, and in such a construction the bracket can be inserted into two channels separated by a relatively short distance or rotated ninety degrees and inserted into two channels, one on each of the fluorescent fixtures. In this case, the end plates offered with the device may vary such that the user can employ a "narrow" configuration or a "wide" configuration depending on the orientation of insertion of the second bracket or brackets. Further, note that attachment holes may be provided in second bracket 301 at a rate of two near each corner, positioned outward from a V-shaped cutout, thus enabling securing second bracket 301 to the fluorescent fixtures in either direction. Such options, including differing sized or differently sizeable end plates, enable the user to construct a lighting arrangement according to his or her size preferences and can be effectively used over enclosures of varying sizes. Further, different sized first brackets may also be provided. In this manner, different types and sizes of LED lights may be employed.

Figure 4:
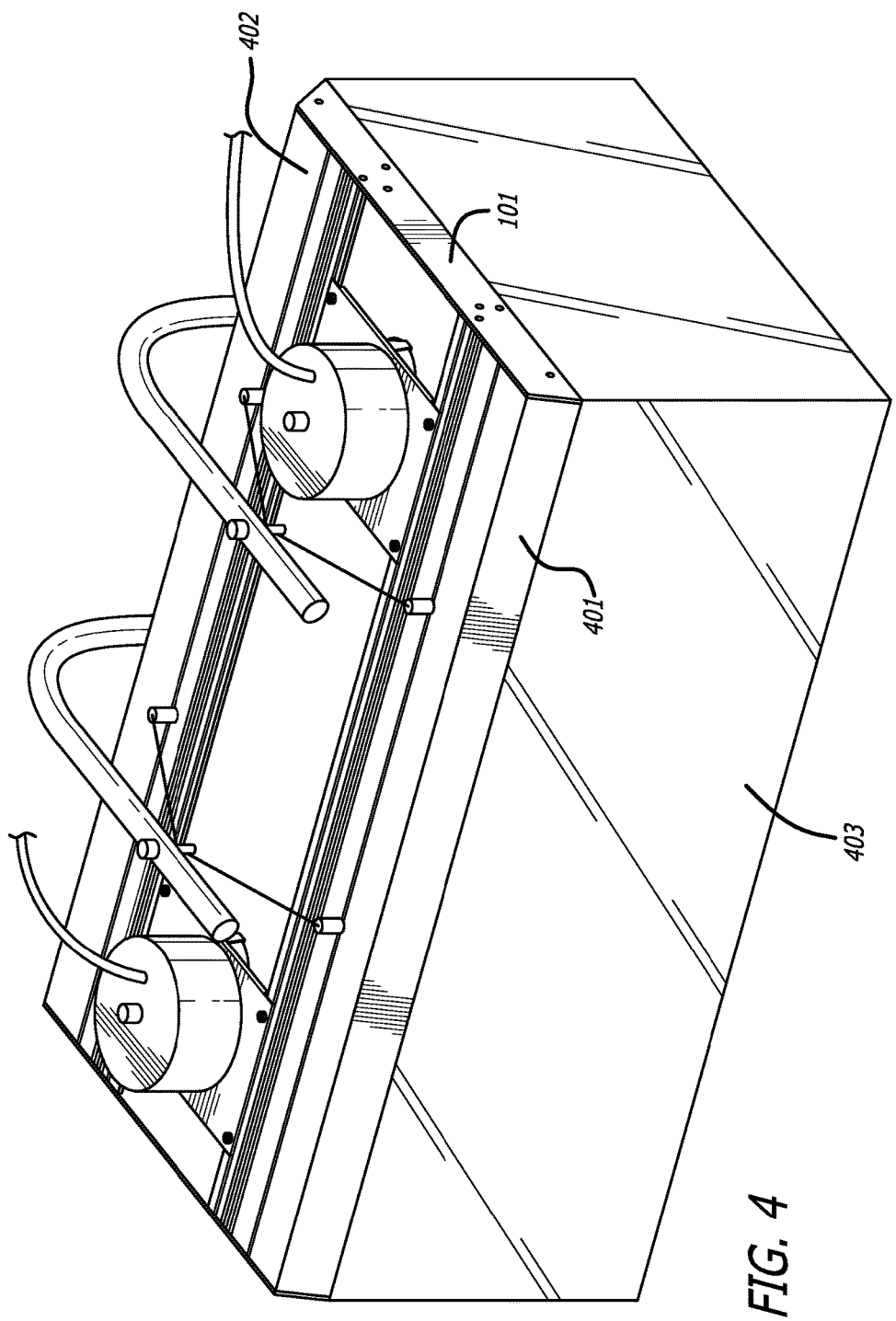
FIG. 4 is a completely assembled version of the design, showing LED and fluorescent lighting capability.

FIG. 4 illustrates one arrangement of the design, including two second brackets similar to second bracket 301 and including LED lights in LED lighting housings 401 and 402. The second brackets are positioned in the channels of the left fluorescent element and right fluorescent element and the below-level holding elements maintain the LED light housings above the area or enclosure. In this manner, the user can turn on LED lights and/or fluorescent lights to beneficially see the flora, fauna, and/or objects present in the enclosure 403.

Figure 5:
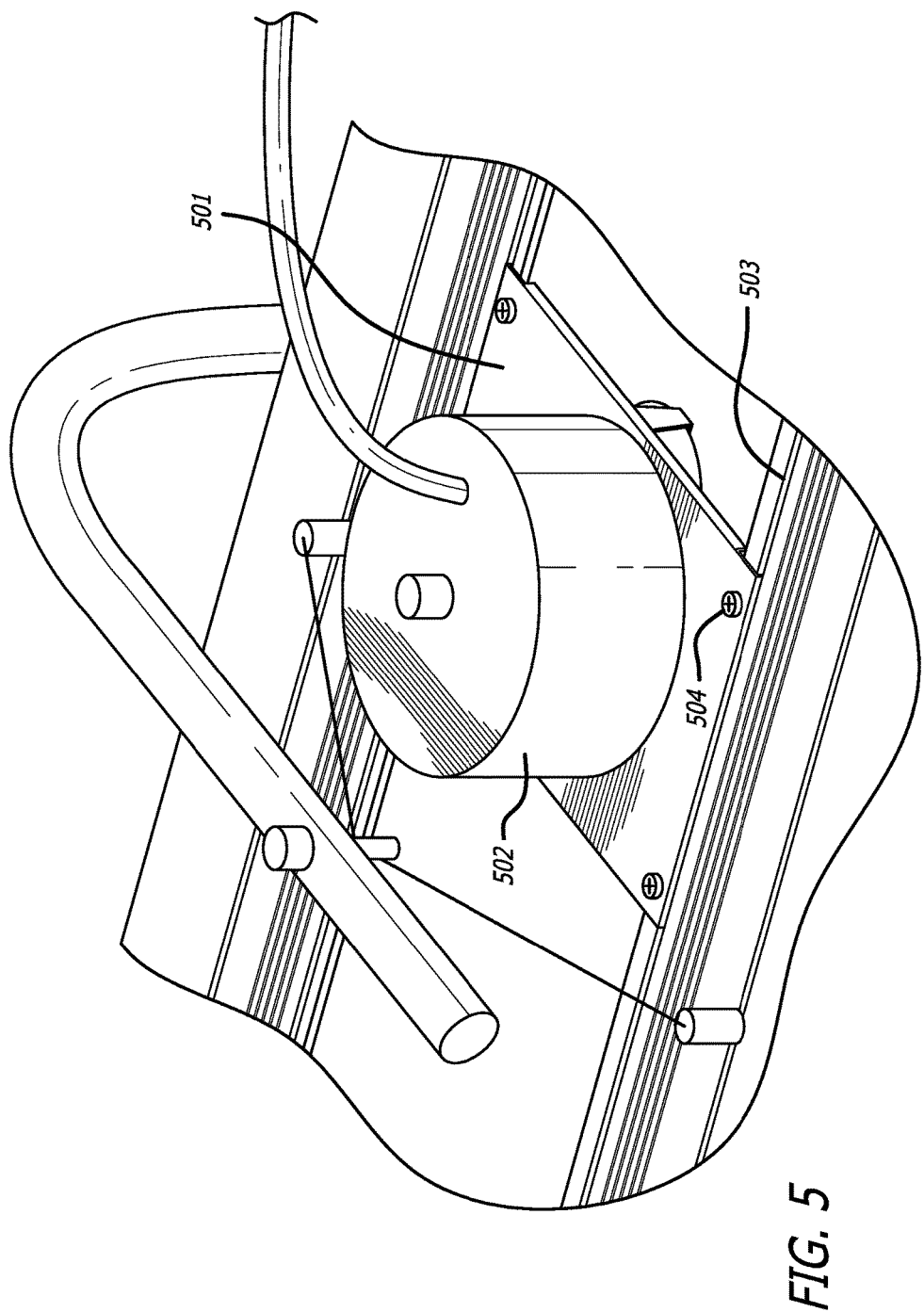
FIG. 5 represents a close view of a second bracket similar to the second bracket of FIG. 3.

FIG. 5 represents a close view of a second bracket 501 similar to bracket 301 and showing an LED light housing 502. In this view, the channel 503 is shown receiving one edge of bracket 501, while the opposing edge of second bracket 501 is provided in the channel of the second fluorescent fixture, but not visible in this view. This second bracket 501 is affixed to, and in this embodiment screwed into, the respective fluorescent element using connection hardware, for example, screw 504.

The second bracket hole is dimensioned to receive a typical LED lighting housing, but as noted may take on different shapes as appropriate, and the indentations enable the insertion of the LED lighting housing without risk of rotation.

The present design may thus be considered a type of kit, wherein the user can employ both LED and fluorescent lighting in a configuration of his or her choice, with different dimensions available for the overall construction based on components chosen. In certain configurations, the farthest ends of the two fluorescent fixtures may be varying distances apart, such as 16, 18, or 24 inches. Different sized end plates or brackets may be provided based on circumstances. Such a design enables the user to change the size of the combined lighting fixture.

Thus the present design may in one embodiment include two end plates on each short side of the fixture to hold the fluorescent fixtures or fluorescent elements together, two fluorescent fixtures or elements with built-in electronic ballasts to power fluorescent light bulbs, one, two, or more mounting brackets with screw slots that can accommodate different brands of LED fixtures, a channel on each long side of the fixture to accommodate brackets that will allow the fixture to rest on the enclosure, such as an aquarium frame, suspension cables and hardware that may attach to the fixture housing and allow the entire unit to be suspended over the enclosure, aquarium, or other arrangement or device, and a mounting bracket that can accommodate different brands of LED fixtures.

According to another embodiment, there is provided a set of two endplates that attach to fluorescent fixtures and hold the fluorescent fixtures together and in place. Electronic ballasts are included inside the fluorescent fixture housings to operate fluorescent bulbs. Two channels are provided on the top of the fixture housings. These channels allow the rectangular first mounting bracket and the second (round hole) mounting bracket to securely attach to the fluorescent fixture housings. Suspension hardware can attach to one of the top channels in the fixture housing. Another channel or set of slots located on the outside of one or both fluorescent fixture housings can accommodate a mounting bracket or brackets or other hardware that holds the fixture unit on, for example, an enclosure frame. The slots or indentations in the second mounting bracket allow for different models of LED fixtures to be attached to the fixture.

In operation, two fluorescent light fixture housings are connected with endplates. Fluorescent bulbs, commonly available, may be inserted into sockets in fluorescent light fixtures. A space is provided between the two fluorescent fixtures. The first and/or second mounting brackets bridge between the two fluorescent fixtures and slide into tracks or channels provided in the fixtures. LED fixtures and housings can be mounted to each second bracket provided, typically through a round hole provided therein and suspended using below-level holding elements. Once positioned in the channels, each bracket can slide to a desired location and be locked into place, using locking means such as screws. When assembled, the fixture has LED light positioned between the fluorescent lights, and the complete, assembled unit can be placed on top of the enclosure or area or be suspended using suspension cables or other support means.

Dimmable ballasts may be added to the fluorescent fixture housing to allow for dimming of the user-supplied bulbs. The completely assembled unit may be mounted over an enclosure using bars or rods. Further, an on/off timer may be employed within or outside the fluorescent fixtures.

Thus according to one aspect of the present design, there is provided a combined fluorescent and Light Emitting Diode (LED) lighting apparatus, comprising two fluorescent lighting fixtures, each fluorescent lighting fixture configured to receive fluorescent light bulbs and having a lengthwise channel on a top surface proximate a longest side and a mounting bracket having two external edges configured to fit into lengthwise channels on the two fluorescent lighting fixtures and configured to receive and maintain an LED light fixture.

According to a further aspect of the present design, there is provided a combined fluorescent and LED lighting apparatus, comprising two fluorescent lighting fixtures, each fluorescent lighting fixture configured to receive fluorescent light bulbs and a mounting bracket having two external edges configured to fit into a first lengthwise channel on a first fluorescent lighting fixture and a second lengthwise channel on a second fluorescent lighting fixture. The mounting bracket is configured to receive and maintain an LED light fixture.

According to another aspect of the present design, there is provided a lighting apparatus, comprising two fluorescent lighting fixtures, each fluorescent lighting fixture configured to receive fluorescent light bulbs and an LED lighting source mounting bracket configured to receive and maintain an LED light fixture. The LED lighting source mounting bracket is formed with two external edges configured to fit into a first lengthwise channel on a first fluorescent lighting fixture and a second lengthwise channel on a second fluorescent lighting fixture.

The devices, processes and features described herein are not exclusive of other devices, processes and features, and variations and additions may be implemented in accordance with the particular objectives to be achieved. For example, devices and processes as described herein may be integrated or interoperable with other devices and processes not described herein to provide further combinations of features, to operate concurrently within the same devices, or to serve other purposes. Thus it should be understood that the embodiments illustrated in the figures and described above are offered by way of example only. The invention is not limited to a particular embodiment, but extends to various modifications, combinations, and permutations that fall within the scope of the claims and their equivalents.

The design presented herein and the specific aspects illustrated are meant not to be limiting, but may include alternate components while still incorporating the teachings and benefits of the invention. While the invention has thus been described in connection with specific embodiments thereof, it will be understood that the invention is capable of further modifications. This application is intended to cover any variations, uses or adaptations of the invention following, in general, the principles of the invention, and including such departures from the present disclosure as come within known and customary practice within the art to which the invention pertains.

The foregoing description of specific embodiments reveals the general nature of the disclosure sufficiently that others can, by applying current knowledge, readily modify and/or adapt the system and method for various applications without departing from the general concept. Therefore, such adaptations and modifications are within the meaning and range of equivalents of the disclosed embodiments. The phraseology or terminology employed herein is for the purpose of description and not of limitation.

What is claimed is:

1. A combined fluorescent and Light Emitting Diode (LED) lighting apparatus, comprising:
    two fluorescent lighting fixtures, each fluorescent lighting fixture configured to receive fluorescent light bulbs and having a lengthwise channel on a top surface proximate a longest side; and
    a mounting bracket having two external edges configured to fit into lengthwise channels on the two fluorescent lighting fixtures and configured to receive and maintain an LED light fixture.

2. The combined fluorescent and LED lighting apparatus of claim 1, further comprising an end piece affixed to a shortest side of each of the two lighting fixtures.

3. The combined fluorescent and LED lighting apparatus of claim 2, further comprising a further end piece affixed to an opposite shortest side of each of the two lighting fixtures.

4. The combined fluorescent and LED lighting apparatus of claim 1, further comprising a component mounting bracket having two external edges configured to fit into lengthwise channels on the two fluorescent lighting fixtures and comprising openings configured to allow binding hardware to bind a component to an upper or lower side of the component mounting bracket.

5. The combined fluorescent and LED lighting apparatus of claim 1, further comprising a suspension arrangement configured to maintain the lighting apparatus and configured to join the lighting apparatus at at least one point formed on the top surface of the two fluorescent lighting fixtures.

6. The combined fluorescent and LED lighting apparatus of claim 1, wherein each of the two fluorescent lighting fixtures comprises an exterior side channel on the longest side of each of the two fluorescent lighting fixtures, wherein the exterior side channel facilitates receiving a bracket holding the lighting apparatus over an enclosure.

7. The combined fluorescent and LED lighting apparatus of claim 1, wherein the mounting bracket comprises an opening with at least one indentation and at least one below-level holding element configured to maintain the LED light fixture.

8. The combined fluorescent and LED lighting apparatus of claim 1, further comprising dimmable ballast provided in at least one fluorescent lighting fixture.

9. The combined fluorescent and LED lighting apparatus of claim 1, further comprising a timer in at least one fluorescent lighting fixture.

10. A combined fluorescent and Light Emitting Diode (LED) lighting apparatus, comprising:
    two fluorescent lighting fixtures, each fluorescent lighting fixture configured to receive fluorescent light bulbs; and
    a mounting bracket having two external edges configured to fit into a first lengthwise channel on a first fluorescent lighting fixture and a second lengthwise channel on a second fluorescent lighting fixture;
    wherein the mounting bracket is configured to receive and maintain an LED light fixture.

11. The combined fluorescent and LED lighting apparatus of claim 10, further comprising a suspension arrangement configured to maintain the lighting apparatus and configured to join the lighting apparatus at at least one point formed on the top surface of the two fluorescent lighting fixtures.

12. The combined fluorescent and LED lighting apparatus of claim 10, wherein each of the two fluorescent lighting fixtures comprises an exterior side channel on the longest side of each of the two fluorescent lighting fixtures, wherein the exterior side channel facilitates receiving a bracket holding the lighting apparatus over an enclosure.

13. The combined fluorescent and LED lighting apparatus of claim 10, wherein the mounting bracket comprises an opening with at least one indentation and at least one below-level holding element configured to maintain the LED light fixture.

14. The combined fluorescent and LED lighting apparatus of claim 10,
    wherein the two fluorescent lighting fixtures are connected using two connecting pieces.

15. A lighting apparatus, comprising:
    two fluorescent lighting fixtures, each fluorescent lighting fixture configured to receive fluorescent light bulbs; and
    a Light Emitting Diode (LED) lighting source mounting bracket configured to receive and maintain an LED light fixture;
    wherein the LED lighting source mounting bracket is formed with two external edges configured to fit into a first lengthwise channel on a first fluorescent lighting fixture and a second lengthwise channel on a second fluorescent lighting fixture.

16. The lighting apparatus of claim 15, further comprising a suspension arrangement configured to maintain the lighting apparatus and configured to join the lighting apparatus at at least one point formed on the top surface of the two fluorescent lighting fixtures.

17. The lighting apparatus of claim 15, wherein each of the two fluorescent lighting fixtures comprises an exterior side channel on the longest side of each of the two fluorescent lighting fixtures, wherein the exterior side channel facilitates receiving a bracket holding the lighting apparatus over an enclosure.

18. The lighting apparatus of claim 15, wherein the LED lighting source mounting bracket comprises an opening with at least one indentation and at least one below-level holding element configured to maintain the LED light fixture.

19. The lighting apparatus of claim 15, wherein the LED lighting source mounting bracket comprises openings facilitating hardware affixation of the LED lighting source mounting bracket to both of the two fluorescent lighting fixtures.

20. The lighting apparatus of claim 15, wherein the LED lighting source mounting bracket is rectangular in shape with different dimensions on two sides than opposing two sides, and the LED lighting source mounting bracket is formed with two additional external edges perpendicular to the two external edges, wherein the two additional external edges are configured to fit into the first lengthwise channel on the first fluorescent lighting fixture and the second lengthwise channel on the second fluorescent lighting fixture.

* * * * *